United States Patent [19]
Anderson et al.

[11] Patent Number: 5,523,901
[45] Date of Patent: Jun. 4, 1996

[54] SYSTEM FOR CORRECTING TRANSDUCER TANGENTIAL SKEW IN A DISK DRIVE SYSTEM HAVING TWO ACTUATORS

[75] Inventors: Kurt Anderson, Louisville; Aaron Wilson, Berthoud, both of Colo.

[73] Assignee: Conner Peripherals, Inc., San Jose, Calif.

[21] Appl. No.: 287,462

[22] Filed: Aug. 8, 1994

Related U.S. Application Data

[63] Continuation of Ser. No. 7,585, Jan. 22, 1993, abandoned.

[51] Int. Cl.$^6$ .................................................. G11B 5/596
[52] U.S. Cl. ........................................ 360/77.08; 360/51
[58] Field of Search .................................. 360/76, 78.05, 360/51, 61, 63, 72.2, 73.03, 77.05, 77.08, 64, 77.02, 75, 47, 49

[56] References Cited

U.S. PATENT DOCUMENTS

| | | | |
|---|---|---|---|
| 4,807,063 | 2/1989 | Moteki | 360/78.04 X |
| 5,177,652 | 1/1993 | Yamaguchi et al. | 360/78.05 |
| 5,223,993 | 6/1993 | Squires et al. | 360/77.08 |
| 5,241,433 | 8/1993 | Anderson et al. | 360/77.04 |
| 5,261,058 | 11/1993 | Squires et al. | 360/78.12 X |

*Primary Examiner*—Aristotelis Psitos
*Assistant Examiner*—James L. Habermehl
*Attorney, Agent, or Firm*—Fliesler, Dubb, Meyer & Lovejoy

[57] ABSTRACT

In a disk drive system having two actuators, each said actuator having a plurality of transducers, said system employing a transducer switching procedure for switching between a first presently selected transducer and a second to be selected transducer, an apparatus, associated with the nonpackwriting actuator, for controlling the sensing of an address mark by said second transducer, said apparatus comprising an address mark means for generating an address mark search signal to start an address mark search when an address mark is expected to be read by said first transducers; and an adjusting means connected to said address mark means for altering the time when said address mark means will generate said address mark search signal such that said second transducer will read the next address mark to occur on the track being read by said second transducer after said second transducer is selected.

19 Claims, 2 Drawing Sheets

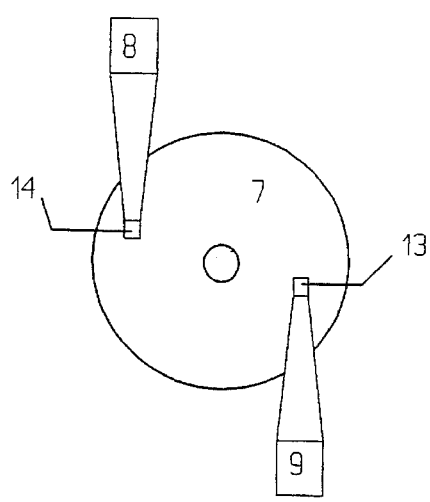
FIG. 1
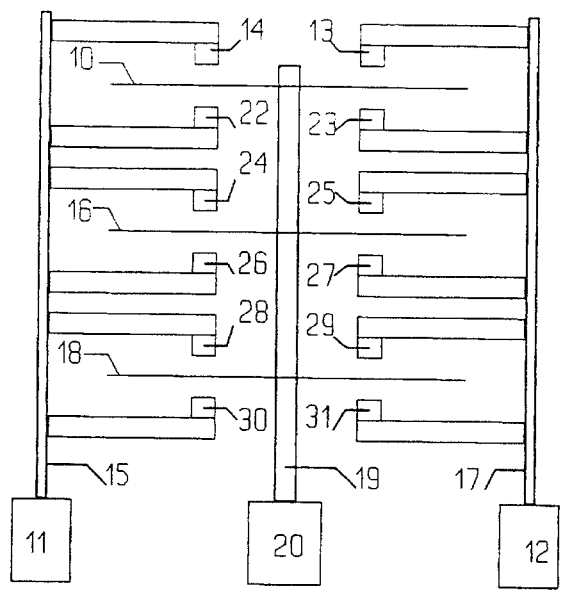
FIG. 2
| TRANSDUCER SWITCH | ZONE I | ZONE II | ZONE III | ZONE IV |
|---|---|---|---|---|
| 13 TO 23 | C11 | C21 | C31 | C41 |
| 13 TO 25 | C12 | C22 | C32 | C42 |
| 13 TO 27 | C13 | C23 | C33 | C43 |
| 13 TO 29 | C14 | C24 | C34 | C44 |
| 13 TO 31 | C15 | C25 | C35 | C45 |
FIG. 6

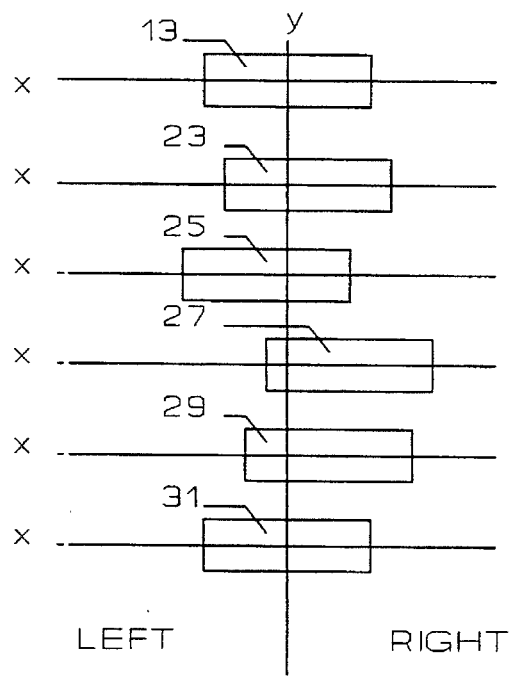
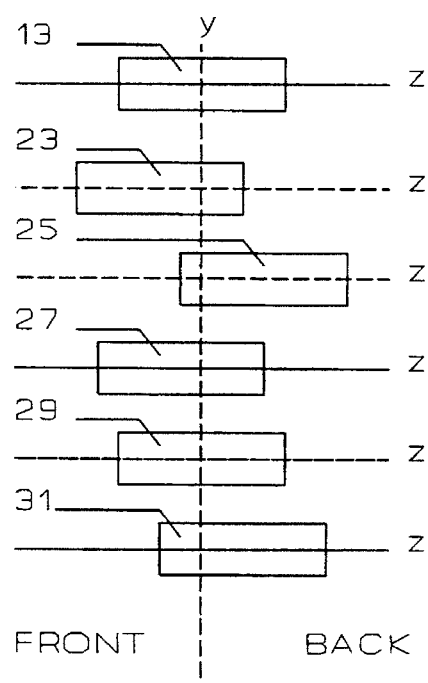
FIG. 3    FIG. 4
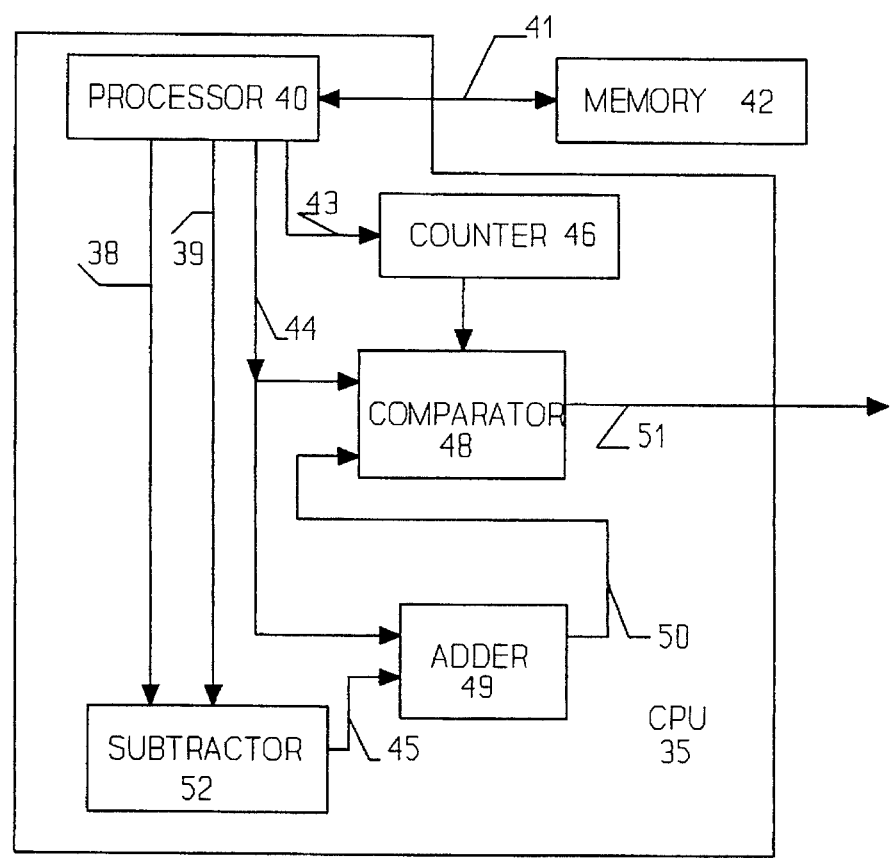
FIG. 5

SYSTEM FOR CORRECTING TRANSDUCER TANGENTIAL SKEW IN A DISK DRIVE SYSTEM HAVING TWO ACTUATORS

This application is a continuation of Ser. No. 08/007,585, filed Jan. 22, 1993, now abandoned.

A portion of the disclosure of this patent document contains material which is subject to copyright protection. The copyright owner has no objection to the facsimile reproduction by any one of the patent documents or the patent disclosure as it appears in the United States Patent & Trademark Office patent file or records, but otherwise reserves all copyright rights whatsoever.

CROSS-REFERENCE TO RELATED APPLICATIONS

DISK DRIVE SYSTEM USING MULTIPLE EMBEDDED QUADRATURE SERVO FIELDS, Ser. No. 386,504, filed Jul. 27, 1989, assigned to the assignee of the present application;

ADAPTIVE READ EQUALIZER WITH SHUTOFF MODE FOR DISK DRIVES, Ser. No. 559,899, filed Jul. 30, 1990, assigned to the assignee of the present application;

DISK DRIVE SYSTEM EMPLOYING ADAPTIVE READ/WRITE CHANNEL CONTROLS AND METHOD OF USING SAME, Ser. No. 420,371, filed Oct. 12, 1989, assigned to the assignee of the present application;

HIGH PERFORMANCE DISK DRIVE ARCHITECTURE, Ser. No. 07/612,427, filed Nov. 9, 1990, assigned to the assignee of the present application; and MULTIPLE ACTUATOR DISK DRIVE, Ser. No. 07/614,853, filed Nov. 9, 1990, assigned to the assignee of the present application.

Each of these Related Applications is hereby incorporated by reference.

BACKGROUND OF THE INVENTION

1. Field of the Invention

The present invention is generally related to hard disk drives and disk drive electronic control systems. In particular, the present invention relates to a system for tangential skew correction of the transducers for reading and writing data from the disk in a disk drive system having two actuators.

2. Description of the Related Art

A disk drive system having two actuators is shown in FIG. 1 and is comprised of disk assembly 7 and actuators 8 and 9. Transducer 14 on actuator 8 and transducer 13 on actuator 9 read and write information to and from the disk on disk assembly 7. Further it is desirable for each of the transducers 13 and 14 to read data regardless which of the transducers recorded the data.

FIG. 2 shows in more detail the disk drive system having two actuators of FIG. 1. Actuator 8 has a head arm assembly 15 where each arm of the head arm assembly 15 carries a transducer to communicate with one of the surfaces of a disk in disk assembly 7. The head arm assembly 15 is connected to a motor 11 for placing a given transducer over a desired track on one of the disk surfaces of disk assembly 7. Disk assembly 7 is comprised of a plurality of disks 10, 16 and 18, shaft 19 and a motor 20. Actuator 8 employs transducers 14 and 22 to interact with top and bottom surfaces of disk 10 respectively, transducers 24 and 26 to interact with the top and bottom surfaces of disk 16 respectively and transducers 28 and 30 to interact with the top and bottom of disk 18 respectively. Actuator 9 is comprised of a motor 12, a head arm assembly 17 and transducers 13, 23, 25, 27, 29 and 31.

In a disk drive system having two actuators, one of the actuators is used as a packwriter to record on each disk surface system operational information such as servo data, sector marks, address marks and like information. Actuator 8 is used as the packwriter to record the system information on the surfaces of disks 10, 16 and 18. Thus there is no radial or tangential skew problem associated with transducers 14, 22, 24, 26, 28 and 30 because their physical location with respect to each other and with respect to the disk surface remains a constant.

The spatial relationship between transducers 14, 22, 24, 26, 28 and 30 of actuator 8 will be different than the spatial relationships between actuators 13, 23, 25, 27, 29 and 31 of actuator 9. There is no physical means to align the transducers on the head arm assembly of actuator 9 to accurately duplicate the spatial relationship of the transducers on actuator 8. The radial and tangential skew between the transducers on the head arm assemble of the nonpackwriter actuator does cause a delay in obtaining proper transducer placement over a desired track during a transducer switching operation between transducers associated with the nonpackwriter actuator.

Assuming that transducer 13 is used as the reference transducer, it can be seen from FIG. 3 that transducers 23, 25, 27, 29 and 31 can be radially offset either to the right or left of reference transducer 13. Such an offset to the right or left of transducers 23, 25, 27, 29 and 31 may cause these transducers to be located over different tracks than the reference transducer 13. Of course, a transducer may in fact be in alignment with the reference transducer 13 as shown with respect to transducer 31. Therefore, transducer 31 will be over the same track as transducer 13 which still may not be the correct track because the spatial relationship between transducers 13 and 31 may be different than the spatial relationship between packwriter transducers 14 and 30. Thus a track correction may have to be made for transducers 23, 25, 27, 29 and 31 to place the transducer over the correct track before data may be read or written properly.

FIG. 4 uses transducer 13 as a reference and shows that transducers 23, 25, 27, 29 and 31 may be tangentially offset to the front or to the rear of reference transducer 13. Where the transducer is offset to the front of reference transducer 13, the address mark will appear earlier than the address mark at the reference transducer 13. Where the transducer is set to the rear of reference transducer 13, the address mark will occur later than the address mark at the reference transducer 13.

In the disk drive system using a sectored embedded servo, control circuitry is synchronized to data read from the desired track on the disk surface. The system expects the occurrence of servo data, sector marks and address marks to occur at specific times and sets timers to trigger circuitry to search for the occurrence of servo data, sector marks and address marks.

If reference transducer 13 is being used and the system switches to transducer 23, the system would still expect the address mark to occur at the time that the address mark would have occurred for transducer 13. Therefore the start of the address mark search by the system can begin after the address mark has passed beneath transducer 23 since transducer 23 is physical ahead of transducer 13. The address mark will therefore be missed and the system would have to go through the entire synchronization procedure before the system could ascertain the track location of transducer 23.

SUMMARY OF THE INVENTION

It is therefore an object of the present invention to establish a system to compensate for the tangential offset of the transducers on the nonpackwriting actuator such that the next address mark appearing on the data track after a transducer switching operation will be properly read by the newly selected transducer, thereby increasing the overall efficiency of the disk drive system.

The present invention develops a reference table of the time offset between designated transducer and all of the other transducers of the nonpackwriting actuator in the drive disk drive system having two actuators. The table is stored in memory and is used in each transducer switching operation of the nonpackwriting actuator. During a transducer switching operation, means calculate the correction factor for the newly selected transducer from the table stored in memory and adjust the time when the start of the next index mark search should occur, as established by the prior transducer, such that the time for the start of the address mark search will be that time for properly starting the address mark search for the newly selected transducer. This system will cause the newly selected transducer to sense the first address mark to occur after the transducer switching operation. As a result of obtaining the address mark information, the transducer can then be placed over the correct track such that a data transfer operation may proceed.

BRIEF DESCRIPTION OF THE DRAWINGS

The invention will be described with respect to the particular embodiments thereof and reference will be made to the drawings, in which:

FIG. 1 is a high level diagram of a disk drive system having two actuators;

FIG. 2 is a diagram showing the relationships of the various transducers associated with each of the actuators with a disk surfaces of the disk drive system;

FIG. 3 is a diagram of the skew, along the X axis, to the left or right of a reference transducer of the other transducers associated with the nonpackwriting actuator in a disk drive system having two actuators;

FIG. 4 is a diagram showing the skew, along the Z axis, ahead or to the rear of a reference transducer of the other transducers associated with the nonpackwriting actuator of a disk drive system having two actuators;

FIG. 5 is a logic diagram for tangential skew correction during a transducer switching operation for the nonpackwriting actuator in a disk drive system having two actuators; and FIG. 6 is a table describing the tangential skew correction factors stored in memory to be used in conjunction with the logic of FIG. 5.

DESCRIPTION OF THE PREFERRED EMBODIMENTS

Referring to FIG. 5, the logic associated with establishing the timing for sensing an address mark in a disk drive system having two actuators is shown.

A disk drive system normally has associated with it a central processing unit (CPU) 35 to control the operation of the disk drive system. CPU 35 will have a processor 40 for controlling such operations as the track seeking, transducer switching, track following, data reading and writing, and transferring data to and from the disk drive system to another processor or memory. CPU 35 has an associated memory unit 42 to store the various control program to be used by processor 40 in controlling the operation of the disk drive system.

The system employs self-synchronizing techniques and uses encoded data in specific areas on the disk to obtain data relevant to system control functions and procedures. Once such type of data is an address mark which is used to determine the identity of the data being read by a transducer in the system. To locate the address mark, processor 40 will establish the time for the start of the search for an address mark in terms of a count value of counter 46. Counter 46 is stepped by clock pluses appearing on line 43. Comparator 48 compares the count value of counter 46 on line 47 and the count value for the for initiating an address mark search appearing on line 44. When a comparison occurs, an address mark search signal is generated on line 51 to signal the start of an address mark search by the system. The system (by logic not herein shown) will open a window during which time the data being read by the selected transducer is expected to be an address mark.

This invention incorporates into the foregoing, subtractor 52 to subtract the tangential skew correction factor for the presently selected transducer on line 38 from the tangential skew correction factor for the transducer to be selected on line 39. The results of the subtraction is provided on line 45 as the transducer switching correction factor to be used in the transducer switching procedure. Adder 49 adds the transducer switching correction factor on line 45 to the anticipated start address mark search count on line 44 to generate a new start address mark search count on line 50 to be used by comparator 48. It should be noted that the transducer switching correction factor is only used to search for the first address mark after a transducer switching operation. After the first address mark has been sensed, processor 40 will thereinafter generate the proper next start address mark search count in accordance with the normal address mark search procedure.

More specifically, referring to FIG. 6, a table is stored within memory of the tangential skew correction factors for transducer switching operations between reference transducer 13 and transducers 23, 25, 27, 29 and 31 of actuator 9 The usable recording surface of the disk is divided into four zones and a correction factor is established for each of the zones. It has been found that the arc path transversed by the transducers on the packwriting actuator is different from the arc path transversed by transducers of the nonpackwriting actuator. As a result of the differences in the arc path followed by the transducer associated with both actuators for interacting with the same disc surface, the tangential skew correction factor is not a constant. To mitigate this problem, the tracks have been divided into four zones and the tangential skew correction factor is established in each zone with the reference transducer located over the center track of the zone. During a transducer switching operation, the processor 40 will read the correction factor for the present transducer selected and the correction factor for the transducer to be selected. The correction factor of the present selected transducer is subtracted from the value of the newly selected transducer and this value becomes the value of the correction factor which appears on line 45 of FIG. 5 and sent to adder 49. This procedure allows the correction factor between any two transducers in any zone to be determined while only storing the correction factor for switching between the reference transducer and each of the other transducers for each of the zones. The amount of data to be stored in support of this invention is thereby minimized.

For example, if reference transducer 13 is selected and it is desired to switch to transducer 27 and the reference transducer 13 is presently within zone 2, then correction factor C23 will be used. Since the reference transducer is the transducer to be switched from, the correction value for that transducer is deemed to be zero and, therefore, the effective correction factor for that transducer switching operation is the value C23 as shown in FIG. 6.

Next assume that transducer 31 is selected and it is desired perform a transducer switching operation to select transducer 23. Further assume that transducer 31 is presently within zone 3. The processor 40 recovers from memory 42 the value of C35 for transducer 31 and C32 for transducer 23. The transducer switching correction factor for this transducer switching operation will be C35 minus C31. It should further be realized that the correction factors can be of a positive or negative number as they are adjusting the count in a forward or backward direction. By viewing FIG. 4, transducer 31, being to the rear of the reference transducer 13, would have a positive correction factor which would cause the start address mark search signal on line 51 to occur at a later time than had reference actuator 13 been used. In similar fashion, actuator 23 is ahead of reference actuator 13 and its correction factor would be a negative correction factor which will cause the start address mark search signal on line 51 to occur at an earlier time than the address mark signal which would have been generated for reference transducer 13. The correction factor for the transducer switching operation from transducer 31 to transducer 23 would mean that transducer 23 is in front of transducer 31 and, therefore, a negative value should result to cause the start of an address mark search to occur at an earlier time than would have been predicted for the start of an address mark search when using transducer 31. Therefore the subtracting from the newly assigned transducer 23, the value of the present selected transducer 31 will yield a negative number which will cause the start of the address mark search for transducer 23 to occur at an earlier time than the start of the address mark search that would have occurred for transducer 31.

Once the address mark has been properly read by transducer 23 then a correction can be made to bring transducer 23 to the desired track. Since the address mark identifies the track presently being read, the system can adjust transducer 23 to the correct track such that a data operations may be initiated.

The correction factors as shown in FIG. 6 are obtained by means of the circuitry shown in FIG. 5. During the manufacture of the disk drive system having two actuators, a microprogram is run to determine the values of the correction factors. Since there is no simple way, without additional hardware, of measuring the time difference directly within the system, a trial and error system is employed. The trial and error system will be described for a transducer switching operation from transducer 13 to transducer 23 in zone 1 for exemplary purposes. The same procedure is performed for the transducer switching operation for each transduce with regard to the reference transducer for each zone on the disk.

The procedure calls for a transducer switching operation to be performed between transducer 13 and 23 and the procedure notes if an address mark was sensed by transducer 23 at the expected time. If no address mark was sensed during the address window, then a correction factor is added in a forward direction and the switch operation is again attempted. The method will alternate by adding a forward or backward correction factor to the initial setting, increasing the value of the correction factor each time used, until an address mark is first obtained. The system then incrementally increases the correction factor in the direction in which the address mark was first sensed until the address mark is lost. This indicates a maximum correction factor. The correction factor is then incrementally decreased during transducer switching operations until the address mark is again lost and this determines the minimum correction factor for the transducer switching operation. The maximum value and minimum value are averaged together such that the correction factor would be in the middle of the maximum and minimum correction values. This value is then stored as the tangential skew correction factor C11 in the table in memory. It should be noted that the process of determining the minimum and maximum values are repeated a number of times to ensure the correctness of the minimum and maximum values.

In the preferred embodiment, the method for generating the tangential skew correction factors is performed by a microprogram stored within memory 42. Further, the method for generating the new address mark search count is performed by a microprogram stored within memory 42 to be used by processor 40 during a transducer switching operation. The invention as described heretofore uses known digital software implementation and the microprogram was assembled using Motorola 68C11 Assembler, series 5.0. The microprogram for carrying out the method for establishing the tangential skew correction factors as shown in FIG. 6 is provided in Appendix A. The microcode for establishing the new corrected address mark search count appearing on line 50 of comparator 48 is provided in Appendix B. The programs of Appendix A and Appendix B carry out the functions as described within the specification. It should be understood that the method can be embodied in other microprograms using other programming languages and assemblers. The microprogram may be permanently stored in a read only memory such that the microprograms become a permanent part of the overall operating system. It is also possible for the transducer switching system to be embodied in hardware logic using the correction factor stored in memory and a state machine to provide the necessary timing.

While the invention has been particularly shown and described with reference to the preferred embodiments therefore, it will be understood by those skilled in the art that changes in form and detail may be made therein without departing from the spirit and scope of the invention. Given the above disclosure of general concepts and specific embodiments, the scope of the protection sought is defined by the following.

APPENDIX A

```
5459              © Conner Peripherals, Inc.  1992
5460
5461                      ; ==============================================
5462                      ; Head switch timing offsets test
5463                      ;
5464                      ; Entry: Head in B, >max = calibrate all heads
5465                      ;        We're already at the desired cylinder
5466                      ; ==============================================
5467  961E  17            HSWTST: TBA                          ;end head = start head
5468  961F  C1 09                 CMPB    #MAXHD               ;check the head
5469  9621  23 03                 BLS             HSWTS0       ;if (head is invalid) then
5470  9623  5F                    CLRB                         ;  start at head 0
5471  9624  86 09                 LDAA    #MAXHD               ;  end at the last one
5472  9626                HSWTS0: PSHD                         ;save the head limits
5473  9626  37                    PSHB
5474  9627  36                    PSHA
5475  9628                        ENDM
5476  9628  CC 96 B7              LDD     #MSD.HS1             ;print the
5477  962B  BD CD 72              JSR             MSG.WT       ;header.
5478  962E  CC 00 00              LDD     #REFHEAD             ;set the test head
5479  9631  B7 10 91              STAA    REF.HD               ;to the reference head and
5480  9634  BD 88 55              JSR             SETH         ;give it an offset of zero.
5481  9637                        PULD                         ;restore the head limits
5482  9637  32                    PULA
5483  9638  33                    PULB
5484  9639                        ENDM
5485                      HSWTS6:                              ;repeat
5486  9639  C1 00                 CMPB    #REFHEAD             ;  compare current head to reference head
5487  963B  27 68                 BEQ             HSWTS8       ;  if (this is not the reference head) then
5488  963D                        PSHD                         ;    save the heads
5489  963D  37                    PSHB
5490  963E  36                    PSHA
5491  963F                        ENDM
5492  963F  BD 96 C4              JSR             HSTEST       ;    run the test.
5493  9642  27 5F                 BEQ             HSWTS7       ;    if (it failed) then
5494  9644  FE 10 07      HSWTSZ: LDX     RWS.LNK              ;      repeat
5495  9647  8C 9D CC              CPX     #RS.IDLE             ;        check for idle
5496  964A  26 F8                 BNE             HSWTSZ       ;      until (r/w idle)
5497  964C  CC 96 AC              LDD     #MSD.HS0             ;      print the retrying
5498  964F  BD CD 72              JSR             MSG.WT       ;      message
5499  9652                        PULD                         ;      retry
5500  9652  32                    PULA
5501  9653  33                    PULB
5502  9654                        ENDM
5503  9654                        PSHD                         ;      this
5504  9654  37                    PSHB
5505  9655  36                    PSHA
5506  9656                        ENDM
5507  9656  BD 96 C4              JSR             HSTEST       ;      head.
5508  9659  27 48                 BEQ             HSWTS7       ;      if (it failed again) then
5509  965B  FE 10 07      HSWTSY: LDX     RWS.LNK              ;        repeat
5510  965E  8C 9D CC              CPX     #RS.IDLE             ;          check for idle
5511  9661  26 F8                 BNE             HSWTSY       ;        until (r/w idle)
5512  9663                        PULD                         ;        head
5513  9663  32                    PULA
5514  9664  33                    PULB
5515  9665                        ENDM
5516  9665                        PSHD                         ;        to B
5517  9665  37                    PSHB
5518  9666  36                    PSHA
5519  9667                        ENDM
5520  9667  5A                    DECB                         ;        one less
5521  9668  2A 02                 BPL             HSWTSA       ;        if (it underflowed) then
5522  966A  C6 09                 LDAB    #MAXHD               ;          wrap it around
5523  966C  F7 10 91      HSWTSA: STAB    REF.HD               ;        make it the reference head
5524  966F  CC 96 AC              LDD     #MSD.HS0             ;        print the retrying
5525  9672  BD CD 72              JSR             MSG.WT       ;        message
5526  9675                        PULD                         ;        play
5527  9675  32                    PULA
5528  9676  33                    PULB
5529  9677                        ENDM
5530  9677                        PSHD                         ;        it again,
5531  9677  37                    PSHB
5532  9678  36                    PSHA
5533  9679                        ENDM
```

```
5534  9679  BD 96 C4                JSR       HSTEST              ;   Sam.
5535  967C                          PSHD                          ;   save the result
5536  967C  37                      PSHB
5537  967D  36                      PSHA
5538  967E                          ENDM
5539  967E  86 00                   LDAA      #REFHEAD            ;   restore the
5540  9680  B7 10 91                STAA      REF.HD              ;   reference head
5541  9683                          PULD                          ;   restore the result
5542  9683  32                      PULA
5543  9684  33                      PULB
5544  9685                          ENDM
5545  9685  4D                      TSTA                          ;   check it
5546  9686  27 1B                   BEQ       HSWTS7              ;   if (it failed) then
5547  9688  FE 10 07     HSWTSX:    LDX       RWS.LNK             ;     repeat
5548  968B  8C 9D CC                CPX       #RS.IDLE            ;       check for idle
5549  968E  26 F8                   BNE       HSWTSX              ;     until (r/w idle)
5550  9690  BD CD 72                JSR       MSG.WT              ;     print the failure message
5551  9693  CE 04 00                LDX       #ACT.HLT*256        ;     set the
5552  9696  86 00                   LDAA      #STHLTH             ;     health
5553  9698                          SNDCMD                        ;     bit.
5554  9698  12 A0 40 FC  A?:        BRSET     CSTATS,CMD.OUT,A?   ;wait for output empty
5555  969C  DF A2                   STX       CDATAH
5556  969E  97 A1                   STAA      CCMD
5557  96A0  CE 10 00                LDX       #RAMADR
5558  96A3                          ENDM
5559  96A3               HSWTS7:    PULD                          ;   restore the heads
5560  96A3  32                      PULA
5561  96A4  33                      PULB
5562  96A5                          ENDM
5563  96A5  5C           HSWTS8:    INCB                          ;   next head please
5564  96A6  11                      CBA                           ;   compare limit to current head
5565  96A7  24 90                   BHS       HSWTS6              ;until (limit head < current head)
5566  96A9  7E 93 D1     HSWTS9:    JMP       TEND                ;get outta Dodge
5567
5568  96AC  72 65 74 72 79  MSD.HS0 DB        'retrying',CR,LF,0
5569  96B7  0D 0A 43 79 6C  MSD.HS1 DB        CR,LF,'Cyl ',6,<CMD.CYL,2,<CMD.CYL+1,CR,LF,0
5570
5571                      ; =======================================
5572                      ; Head switch timing offsets adaptive test
5573                      ;
5574                      ; Entry: head in B
5575                      ;        we're already at the desired cylinder
5576                      ;
5577                      ; Exit: pointer to error string in D, 0 = no error, Z is valid
5578                      ;       if no error: the optimal value is chosen and set in Niwot,
5579                      ;            including EEROM
5580                      ;       if error: head is set back to value it was before test
5581                      ;
5582                      ; =======================================
5583  96C4  F7 10 17     HSTEST:    STAB      CMD.HD              ;save the head
5584  96C7  37                      PSHB                          ;stack it, too
5585  96C8  BD 88 79                JSR       GETH                ;get this head's current offset
5586  96CB  37                      PSHB                          ;stack it with the head
5587  96CC  CC 98 00                LDD       #MSD.HS2            ;print which head
5588  96CF  BD CD 72                JSR       MSG.WT              ;we're doing
5589  96D2  32                      PULA                          ;restore the current offset
5590  96D3  36                      PSHA                          ;save it again
5591  96D4  CE 80 7F                LDX       #807FH              ;stack initial max and
5592  96D7  3C                      PSHX                          ;min values
5593                      ;
5594                      ;  loop out from the current offset, looking for a range of values
5595                      ;  that sort of work ...
5596                      ;
5597  96D8  F6 10 17                LDAB      CMD.HD              ;head back to B
5598                      HSTES1:                                  ;repeat
5599  96DB  CE 00 14                LDX       #20                 ;   20 seeks max
5600  96DE  BD 98 11                JSR       HSWTIM              ;   run the timing test
5601  96E1  27 0B                   BEQ       HSTESB              ;   if (we couldn't do 20 seeks) then
5602  96E3  30                      TSX                           ;     subtract the original
5603  96E4  A0 02                   SUBA      2,X                 ;     offset from this one
5604  96E6  2E 01                   BGT       HSTESA              ;     if (we're 0 or negative from the original) then
5605  96E8  4A                      DECA                          ;       reduce it by one
5606  96E9  40           HSTESA:    NEGA                          ;     now switch directions
5607  96EA  AB 02                   ADDA      2,X                 ;     and add back the original
5608  96EC  20 1E                   BRA       HSTESX              ;   else if (we did all 20 seeks) then
```

```
5609  96EE  36              HSTESB: PSHA                       ;   try
5610  96EF  80 02                   SUBA    #2                 ;     again
5611  96F1  CE 00 14                LDX     #20                ;       at
5612  96F4  BD 98 11                JSR             HSWTIM     ;         two
5613  96F7  32                      PULA                       ;           less
5614  96F8  27 04                   BEQ             HSTESC     ;   if (we couldn't do 20 seeks) then
5615  96FA  88 02                   ADDA    #2                 ;     move away from the failure
5616  96FC  20 0E                   BRA             HSTESX     ;   else if (we did all 20 seeks) then
5617  96FE  36              HSTESC: PSHA                       ;     try
5618  96FF  88 02                   ADDA    #2                 ;       again
5619  9701  CE 00 14                LDX     #20                ;         at
5620  9704  BD 98 11                JSR             HSWTIM     ;           two
5621  9707  32                      PULA                       ;             more
5622  9708  27 02                   BEQ             HSTESX     ;   if (we couldn't do 20 seeks) then
5623  970A  80 02                   SUBA    #2                 ;     move away from the failure
5624  970C  8C 00 00        HSTESX: CPX     #0                 ; check the result
5625  970F  27 0E                   BEQ             HSTES2     ;until (we find a range that works)
5626  9711  81 78                   CMPA    #120               ;
5627  9713  2C 04                   BGE             HSTESD     ;or (we've reached the upper limit)
5628  9715  81 88                   CMPA    #-120              ;
5629  9717  2E C2                   BGT             HSTES1     ;or (we've reached the lower limit)
5630                                                           ;if (we went too far) then
5631  9719  CC 97 B4        HSTESD: LDD     #MSD.HSZ           ;  point D to failure message
5632  971C  7E 97 A5                JMP     HSTES8             ;else if (we found a workable value) then
5633                                ;
5634                                ; Continue working down from here until we find the lower limit ...
5635                                ;
5636                        HSTES2:                            ; repeat
5637  971F  CE 00 0A                LDX     #10                ;   10 seeks max
5638  9722  BD 98 11                JSR             HSWTIM     ;   run the timing test
5639  9725  27 06                   BEQ             HSTESS     ;   if (we apparently reached a limit) then
5640  9727  CE 00 0A                LDX     #10                ;     try again
5641  972A  BD 98 11                JSR             HSWTIM     ;     to be sure
5642  972D  22 0A           HSTESS: BHI             HSTES4     ; until (we find a non-usable value)
5643  972F  4A                      DECA                       ;
5644  9730  81 88                   CMPA    #-120              ;
5645  9732  2C EB                   BGE             HSTES2     ; or    (we go too far)
5646                                                           ; if (we went too far) then
5647  9734  CC 97 C7                LDD     #MSD.HSL           ;   point D to failure message
5648  9737  20 6C                   BRA     HSTES8             ; else if (we found a non-working value) then
5649  9739  4C              HSTES4: INCA                       ;   last offset that worked to A
5650  973A                          PSHD                       ;   stack the unadjusted offset & head
5651  973A  37                      PSHB
5652  973B  36                      PSHA
5653  973C                          ENDM
5654  973C  F6 10 91                LDAB    REF.HD             ;   reference head
5655  973F  BD 88 79                JSR             GETH       ;   offset to B.
5656  9742  30                      TSX                        ;   adjust our lower limit
5657  9743  EB 00                   ADDB    0,X                ;   by this much
5658  9745  E7 03                   STAB    3,X                ;   save it
5659  9747  F7 10 A7                STAB    PARM1+1            ;   print
5660  974A  CC 98 06                LDD     #MSD.HS4           ;   the adjusted
5661  974D  BD CD 72                JSR             MSG.WT     ;   result
5662  9750                          PULD                       ;   restore the unadjusted offset & head
5663  9750  32                      PULA
5664  9751  33                      PULB
5665  9752                          ENDM
5666                                ;
5667                                ; Now work up from here +5 to the upper limit ...
5668                                ;
5669  9752  88 05                   ADDA    #5                 ;   go up 5 for hysterisis
5670                        HSTES5:                            ; repeat
5671  9754  CE 00 0A                LDX     #10                ;   10 seeks max
5672  9757  BD 98 11                JSR             HSWTIM     ;   run the timing test
5673  975A  27 06                   BEQ             HSTESZ     ;   if (we apparently reached a limit) then
5674  975C  CE 00 0A                LDX     #10                ;     try again
5675  975F  BD 98 11                JSR     HSWTIM             ;     to be sure
5676  9762  22 0A           HSTESZ: BHI             HSTES6     ; until (we find a non-working value)
5677  9764  4C                      INCA                       ;
5678  9765  81 78                   CMPA    #120               ;
5679  9767  2F EB                   BLE             HSTES5     ; or    (we go too far)
5680                                                           ; if (we went too far) then
5681  9769  CC 97 DB                LDD     #MSD.HSU           ;   point D to failure message
5682  976C  20 37                   BRA             HSTES8     ; else if (we found the upper limit) then
5683  976E  4A              HSTES6: DECA                       ;   back up one to the last offset that worked
```

```
5684   976F                                  PSHD                          ;   save the unadjusted offset and head
5685   976F    37                            PSHB
5686   9770    36                            PSHA
5687   9771                                  ENDM
5688   9771    F6 10 91                      LDAB    REF.HD                ;   reference head
5689   9774    BD 88 79                      JSR             GETH          ;   offset to B.
5690   9777    30                            TSX                           ;   adjust our lower limit
5691   9778    EB 00                         ADDB    0,X                   ;   by this much
5692   977A    E7 02                         STAB    2,X                   ;   save it
5693   977C    F7 10 A7                      STAB    PARM1+1               ;   print
5694   977F    CC 98 06                      LDD     #MSD.HS4              ;   the
5695   9782    BD CD 72                      JSR             MSG.WT        ;   result
5696   9785                                  PULD                          ;   restore the head
5697   9785    32                            PULA
5698   9786    33                            PULB
5699   9787                                  ENDM
5700                                   ;
5701                                   ;   calculate the midway point, set the head to this value
5702                                   ;
5703   9787    30                            TSX                           ;   upper limit
5704   9788    A6 00                         LDAA    0,X                   ;   to A
5705   978A    A0 01                         SUBA    1,X                   ;   subtract the lower limit
5706   978C    81 06                         CMPA    #6                    ;   check for at least a range of 6
5707   978E    2C 05                         BGE             HSTES7        ;   if (range < 6) then
5708   9790    CC 97 EF                      LDD     #MSD.HSR              ;     point D to failure message
5709   9793    20 10                         BRA             HSTES8        ;   else if (range >= 6) then
5710   9795    44                   HSTES7:  LSRA                          ;     divide by 2
5711   9796    AB 01                         ADDA    1,X                   ;     now add back to lower limit
5712   9798    B7 10 A7                      STAA    PARM1+1               ;     save the result
5713   979B    BD 88 55                      JSR             SETH          ;     set the head to the result
5714   979E    CC 98 0C                      LDD     #MSD.HS5              ;     print
5715   97A1    BD CD 72                      JSR             MSG.WT        ;     the result
5716   97A4    4F                            CLRA                          ;     no errors
5717   97A5    38                   HSTES8:  PULX                          ;clean off the stack
5718   97A6    38                            PULX                          ;initial offset & head to B
5719   97A7    4D                            TSTA                          ;check the result
5720   97A8    27 09                         BEQ             HSTES9        ;if (we failed) then
5721   97AA                                  PSHD                          ;   save error pointer
5722   97AA    37                            PSHB
5723   97AB    36                            PSHA
5724   97AC                                  ENDM
5725   97AC    8F                            XGDX                          ;   set the head back
5726   97AD    BD 88 55                      JSR             SETH          ;   to it's original offset
5727   97B0                                  PULD                          ;   restore the error pointer
5728   97B0    32                            PULA
5729   97B1    33                            PULB
5730   97B2                                  ENDM
5731   97B2    4D                            TSTA                          ;   validate Z
5732   97B3    39                   HSTES9:  RTS
5733
5734   97B4    46 61 69 6C 65       MSD.HSZ  DB      'Failed - No zero',CR,LF,0
5735   97C7    46 61 69 6C 65       MSD.HSL  DB      'Failed - No lower',CR,LF,0
5736   97DB    46 61 69 6C 65       MSD.HSU  DB      'Failed - No upper',CR,LF,0
5737   97EF    46 61 69 6C 65       MSD.HSR  DB      'Failed - range',CR,LF,0
5738
5739
5740
5741   9800    48 06 17 3A 20       MSD.HS2  DB      'H',6,<CMD.HD,': ',0
5742   9806    02 A7 20 20 20       MSD.HS4  DB      2,<PARM1+1,'    ',0
5743   980C    02 A7 0D 0A 00       MSD.HS5  DB      2,<PARM1+1,CR,LF,0
5744
5745                                   ;
5746                                   ;   HSWTIM ... head switch timing test
5747                                   ;
5748                                   ;   Entry: offset to use in A
5749                                   ;          head to test in B
5750                                   ;          max # of seeks to do in X
5751                                   ;
5752                                   ;   Exit:  A and B are preserved
5753                                   ;          X contains number of seeks not performed due to excessive errors
5754                                   ;          Z reflects X's value
5755                                   ;
5756   9811    37                   HSWTIM:  PSHB                          ;save the head
5757   9812    36                            PSHA                          ;and the offset
5758   9813    3C                            PSHX                          ;and the seek limit
```

```
5759  9814  BD 88 55                  JSR     SETH                  ;set this head to this offset
5760               HSWTI0:             TSX                           ;repeat
5761  9817  30                                                      ;  test head
5762  9818  E6 03                     LDAB    3,X                   ;  to B
5763  981A  F7 10 17                  STAB    CMD.HD                ;  point to it
5764  981D  BD 98 40                  JSR     SEK.CM                ;  seek there
5765  9820  36                        PSHA                          ;  save the error
5766  9821  F6 10 91   HSWTI2:        LDAB    REF.HD                ;  seek to
5767  9824  F7 10 17                  STAB    CMD.HD                ;  the reference
5768  9827  BD 98 40                  JSR     SEK.CM                ;  head
5769  982A  30                        TSX                           ;  add
5770  982B  AA 00                     ORAA    0,X                   ;  the
5771  982D  A7 00                     STAA    0,X                   ;  errors.
5772  982F  32                        PULA                          ;  get the errors
5773  9830  81 01      HSWTI1:        CMPA    #1                    ;  check it
5774  9832  22 05                     BHI     HSWTI2                ;until (we get > 1 error)
5775  9834  38                        PULX                          ;
5776  9835  09                        DEX                           ;
5777  9836  3C                        PSHX                          ;
5778  9837  26 DE                     BNE     HSWTI0                ;or (we've done all the seeks)
5779  9839  38         HSWTI2:        PULX                          ;restore the seek counter
5780  983A  32                        PULA                          ;restore the offset
5781  983B  33                        PULB                          ;restore the head
5782  983C  8C 00 00                  CPX     #0                    ;validate Z
5783  983F  39                        RTS
5784
5785
5786
5787  9840  CE 00 64   SEK.CM: LDX    #100                           ;loop count to X
5788  9843  18 CE 90 CC SEKCM0: LDY   #RS.IDLE                       ;required r/w state to Y
5789  9847  09                        DEX                            ;decrement loop count
5790  9848  27 76                     BEQ     SEKCM9                 ;while (not timed out)
5791  984A  12 2B 04 0A               BRSET   ER.FLAG,SPN.ER,SEKCMA  ;and   (spin error)
5792                                                                 ;      or
5793  984E  13 81 02 06               BRCLR   RW.CTL,ALOWRT,SEKCMA   ;      (we're not allowing write)
5794  9852  18 BC 10 07               CPY     RWS.LNK                ;      or
5795  9856  27 0C                     BEQ     SEKCM1                 ;      (r/w is not ready) then
5796  9858  3C         SEKCMA: PSHX                                  ;  save the loop count
5797  9859  CC 00 64                  LDD     #100                   ;  wait
5798  985C  BD CA F5                  JSR     DELAY                  ;  100 mS
5799  985F  38                        PULX                           ;  restore the loop count
5800  9860  86 10                     LDAA    #10H                   ;  busy error to A
5801  9862  20 DF                     BRA     SEKCM0                 ;end do
5802
5803  9864  CE 10 00   SEKCM1: LDX    #RAMADR
5804  9867  EC 17                     LDD     <CMD.HD,X              ;get orig parms back
5805  9869  ED 42                     STD     <TGT.HD,X              ;save to target
5806  986B  5F                        CLRB
5807  986C  E7 01                     STAB    <ERROR,X
5808
5809  986E  CE FF FF                  LDX     #-1
5810  9871  09         SEKCM2: DEX
5811  9872  27 09                     BEQ     SEKCM3                 ;b if timeout-force seek
5812  9874  FC 10 05                  LDD     ACT.LNK
5813  9877  1A 83 9C 4E               CPD     #TRAK10                ;track following?
5814  987B  26 F4                     BNE     SEKCM2                 ;B if no
5815
5816  987D  14 A0 01   SEKCM3: BSET   CSTATS,SK.MODE                 ;set seek mode to host
5817  9880  7F 10 71                  CLR     SK.TIME
5818  9883  FC 10 15                  LDD     CMD.CYL
5819  9886  FD 10 40                  STD     TGT.CYL                ;xfr new cyl addr
5820  9889  CE 10 00                  LDX     #RAMADR
5821  988C  CC B5 E6                  LDD     #SEEK20
5822  988F  1D 9B 10                  BCLR    <R.FLAG,X,DID.SEK      ;reset seek retry
5823  9892  FD 10 05                  STD     ACT.LNK                ;issue seek cmd
5824  9895  14 2B 01                  BSET    ER.FLAG,SK.MODE
5825
5826  9898  4F                        CLRA                           ;assume no errors
5827               SEKCM4:                                            ;repeat
5828  9899  13 2B 04 08               BRCLR   ER.FLAG,SPN.ER,SEKCM6  ;  if (spin error) then
5829  989D  4C                        INCA                           ;    count it
5830  989E  26 01                     BNE     SEKCM5                 ;    if (overflow) then
5831  98A0  4A                        DECA                           ;      uncount it
5832  98A1  12 2B 04 FC SEKCM5: BRSET  ER.FLAG,SPN.ER,*              ;    wait for it to go away
5833  98A5  12 2B 01 F0 SEKCM6: BRSET  ER.FLAG,SK.MODE,SEKCM4        ;until (seek complete)
```

```
5834  98A9  FE 10 05              LDX      ACT.LNK                      ;
5835  98AC  8C 9C 4E              CPX      #TRAK10                      ;
5836  98AF  26 E8                 BNE           SEKCM4                  ;and (we're track following)
5837  98B1  13 81 02 E4           BRCLR    RW.CTL,ALOWRT,SEKCM4          ;and (we're allowing write)
5838  98B5  CE 10 00              LDX      #RAMADR                      ;point to ram base
5839  98B8  1F 9B 10 04           BRCLR    <R.FLAG,X,DID.SEK,SEKCM9;if (we had to retry the seek) then
5840  98BC  4C                    INCA                                  ;   count as an error
5841  98BD  26 01                 BNE           SEKCM9                  ;   if (overflow) then
5842  98BF  4A                    DECA                                  ;     uncount it
5843  98C0  4D           SEKCM9:  TSTA
5844  98C1  39                    RTS
5845
```

APPENDIX B

© Conner Peripherals, Inc. 1992

```
10968                          ; ===================================================
10969                          ; Actuator state 2 - initiate seek to TGT.CYL, TGT.HD
10970                          ; ===================================================
10971
10972
10973
10974                          ;
10975  B5E5  3B         SEEK2E: RTI
10976  B5E6  12 2B 04 FB SEEK20: BRSET  ER.FLAG,SPN.ER,SEEK2E  ;B spin error
10977  B5EA  14 2B 01          BSET   ER.FLAG,SK.MODE         ;Set seek mode
10978  B5ED  86 10              LDAA   #10H
10979  B5EF  B7 10 75           STAA   PK.DET                 ;Seek mode peak detector value
10980
10981                          ;Select target head value in PORTD and adjust expected sector time
10982        [01]               IFTRUE TWOACT
10983  B5F2  FE 10 8F           LDX    HSWPTR
10984        [01]               ELSE
10985                           LDX    #HSWTCH
10986        [00]               ENDIF
10987  B5F5  F6 10 34           LDAB   HEAD                   ;get current hd #
10988  B5F8  C4 0F              ANDB   #HD.0+HD.1+HD.2+HD.3   ;remove flag bits
10989  B5FA  3A                 ABX
10990  B5FB  A6 00              LDAA   0,X                    ;Old head offset
10991        [01]               IFTRUE TWOACT
10992  B5FD  FE 10 8F           LDX    HSWPTR
10993        [01]               ELSE
10994                           LDX    #HSWTCH
10995        [00]               ENDIF
10996  B600  F6 10 42           LDAB   TGT.HD                 ;New head address
10997  B603  C4 0F              ANDB   #HD.0+HD.1+HD.2+HD.3
10998  B605  F7 10 34           STAB   HEAD                   ;Save new head number
10999  B608  D7 08              STAB   PORTD                  ;Head select lines
11000  B60A  3A                 ABX
11001  B60B  A0 00              SUBA   0,X                    ;Calc (old-new) offset
11002  B60D  40                 NEGA
11003  B60E  16                 TAB                           ;sign extend...
11004  B60F  48                 LSLA                          ;
11005  B610  86 00              LDAA   #0                     ;CLRA clears carry
11006  B612  82 00              SBCA   #0
11007  B614  D3 1A              ADDD   TOC3
11008  B616  DD 1A              STD    TOC3                   ;Adjust expected sector timing
11009  B618  C3 00 6E           ADDD   #PWR.TM
11010  B61B  DD 16              STD    TOC1                   ;Adjust reference time
11011
11012        [01]               IFTRUE TWOACT
11013        [02]               IFTRUE ACTB
11014  B61D  CC B6 24           LDD    #SK202
11015  B620  FD 10 05           STD    ACT.LNK
11016  B623  3B                 RTI
11017  B624         SK202:
11018        [01]               ENDIF
11019        [00]               ENDIF
11020
```

What is claimed is:

1. In a disk drive system having two actuators, a packwriting actuator and a nonpackwriting actuator, each said actuator having a plurality of transducers where each said transducer reads and writes data onto and from a disk in said disk drive system and where data written on a disk by a transducer on said packwriting actuator can be read by a transducer on said nonpackwriting actuator and data written on a disk by a transducer on said nonpackwriting actuator can be read by a transducer on said packwriting actuator and where simultaneously a transducer on said nonpackwriting actuator can read or write data from or to a disk in said disk drive system and a transducer on said nonpackwriting actuator can read or write data from or to a disk in said disk drive system, said system employing a transducer switching procedure for switching between a selected transducer and a to be selected transducer where said selected and to be selected transducers are on said nonpackwriting actuator, an apparatus comprising:

address mark means for generating an address mark search signal to start an address mark search when an address mark is expected to be read by said selected transducer; and adjusting means connected to said address mark means for altering the time when said address mark means will generate said address mark search signal in response to said transducer switching procedure selecting said to be selected transducer such that said to be selected transducer will read the next address mark to occur on the track being read by said to be selected transducer after said to be selected transducer is selected.

2. The apparatus of claim 1 wherein said adjusting means further comprises;

storage means for storing a tangential skew correction factor for each said transducer associated with said nonpackwriting actuator, said tangential skew correction factor correcting for the tangential skew between one of said transducers established as a reference transducer on said nonpackwriting actuator and each of said remaining transducers on said nonpackwriting actuator;

calculating means connected to said storage means for generating a transducer switching correction factor from said selected transducer's tangential skew correction factor and said to be selected transducer's tangential skew correction factor; and correction means connected to said calculating means and said address mark means to adjust, by said transducer switching correction factor, the time when said address mark means generates the next said address mark search signal.

3. The apparatus of claim 2 wherein said calculating means further comprises;

subtracting means for generating said transducer switching correction factor by subtracting said selected transducer's tangential skew correction factor from said to be selected transducer's tangential skew correction factor.

4. The apparatus of claim 1 wherein said disk drive system having two actuators has a system clock and said address mark means comprises:

counter means step by said system clock;

time means generating a value of the count of said counter when a next address mark search signal is to be generated;

comparator means connected to said counter means and said time means for generating said address mark search signal when said count generated by said time means equals the count of said counter.

5. The apparatus of claim 4 wherein said adjusting means further comprises;

storage means for storing a tangential skew correction factor for each said transducer associated with said nonpackwriting actuator, said tangential skew correction factor correcting for the tangential skew between one of said transducers established as a reference transducer and each of said remaining transducers;

calculating means connected to said storage means for generating a transducer switching correction factor from said selected transducer's tangential skew correction factor and said to be selected transducer's tangential skew correction factor; and correction means connected to said calculating means and said address mark means to adjust, by said transducer correction factor, said count value when said address mark means generates the next said address mark search signal.

6. The apparatus of claim 5 wherein said calculating means further comprises;

subtracting means for generating said transducer switching correction factor by subtracting said selected transducer's tangential skew correction factor from said to be selected transducer's tangential skew correction factor.

7. The apparatus of claim 5 wherein said calculating means further comprises;

adder means connected to said time means and said compare means for adding said count value of said time means to said transducer switching correction factor and inputting said resulting summation to said compare means in place of said count value generated by said time means.

8. The apparatus of claim 7 wherein said calculating means further comprises;

adder means connected to said subtracting means, said time means and said compare means for adding said count value of said time means to said transducer switching correction factor of said subtracting means and inputting said resulting summation to said comparator means in place of said count value generated by said time means.

9. In a disk drive system having two actuators, a packwriting actuator and a nonpackwriting actuator, each said actuator having a plurality of transducers where each said transducer reads and writes data onto and from a disk in said disk drive system and where data written on a disk by a transducer on said packwriting actuator can be read by a transducer on said nonpackwriting actuator and data written on a disk by a transducer on said nonpackwriting actuator can be read by a transducer on said packwriting actuator and where simultaneously a transducer on said nonpackwriting actuator can read or write data from or to a disk in said disk drive system and a transducer on said nonpackwriting actuator can read or write data from or to a disk in said disk drive system, said system employing a transducer switching procedure for switching between a selected transducer which is presently selected and a to be selected transducer which is to be selected where said selected and to be selected transducers are on said nonpackwriting actuator, a method comprising the steps of:

generating in response to said transducer switching procedure switching from said selected transducer to said to be selected transducer on said nonpackwriting actuator a time value for when an address mark search should be initiated to enable the next address mark to be read by said selected transducers; and altering said time value for when an address mark search should be initiated such that said to be selected transducer will read the next address mark to occur on a track being read by said to be selected transducer after said to be selected transducer is selected.

10. The method of claim 9 wherein said altering step further comprises the steps of;

storing a tangential skew correction factor for each said transducer associated with said nonpackwriting actuator, said tangential skew correction factor correcting for the tangential skew between one of said transducers established as a reference transducer on said nonpackwriting actuator and each of said remaining transducers on said nonpackwriting actuator;

calculating a transducer switching correction factor from said selected transducer's tangential skew correction factor and said to be selected transducer's tangential skew correction factor; and correcting said time value by said transducer switching correction factor.

11. The method of claim 10 wherein said calculating step includes the step of;

subtracting said selected transducer's tangential skew correction factor from said to be selected transducer's tangential skew correction factor to generate said transducer switching correction factor.

12. The method of claim 9 wherein said disk drive system having two actuators has a system clock and a counter, said method further comprises the steps of;

stepping a counter by said system clock;

establishing a count of said counter for generating an address mark search signal; and generating said address mark search signal when said count equals the count of said counter.

13. The method of claim 12 wherein said altering step further comprises the steps of;

storing a tangential skew correction factor for each said transducer associated with said nonpackwriting actuator, said tangential skew correction factor correcting for the tangential skew between one of said transducers established as a reference transducer on said nonpackwriting actuator and each of said remaining transducers on said nonpackwriting actuator;

calculating a transducer switching correction factor from said selected transducer's tangential skew correction factor and said to be selected transducer's tangential skew correction factor; and correcting said time value by said transducer switching correction factor.

14. The method of claim 13 wherein said calculating step includes the step of;

subtracting said selected transducer's tangential skew correction factor from said to be selected transducer's tangential skew correction factor to generate said transducer switching correction factor.

15. The method of claim 14 wherein said calculating step further comprises the step of;

adding said count to said transducer switching correction factor to form a resulting summation;

substituting said resulting summation for said count in said generating step for said address mark signal.

16. The method of claim 13 wherein said calculating step further comprises the step of;

adding said count to said transducer switching correction factor to form a resulting summation;

substituting said resulting summation for said count in said generating step for said address mark signal.

17. The method of claim 9 wherein said disk drive system has an address mark detection means for initiating an address mark search as a function of a designated count in a counter within said address mark means and said step of storing further comprises the step of:

generating tangential skew correction factors for each transducer associated with the nonpackwriting actuator in said disk drive system having two actuators.

18. In a disk drive system having two actuators, a packwriting actuator and a nonpackwriting actuator, each said actuator having a plurality of transducers wherein each said transducer reads and writes data onto and from a disk in said disk drive system and where data written on a disk by a transducer on said packwriting actuator can be read by a transducer on said nonpackwriting actuator and data written on a disk by a transducer on said nonpackwriting actuator can be read by a transducer on said packwriting actuator and where simultaneously a transducer on said nonpackwriting actuator can read or write data from or to a disk in said disk drive system and a transducer on said nonpackwriting actuator can read or write data from or to a disk in said disk drive system, said system employing a transducer switching procedure for switching between a selected transducer which is presently selected and a to be selected transducer which is to be selected transducer where said selected and to be selected transducers are on said nonpackwriting actuator and said disk drive system has an address mark detection means for initiating an address mark search as a function of a designated count in a counter within said address mark means, a method comprising the steps of:

generating tangential skew correction factors for each transducer associated with the nonpackwriting actuator in said disk drive system having two actuators, wherein said step of generating said tangential skew correction factors comprising the steps of:

a) selecting one of said transducers on said nonpackwriting actuator as a reference transducer whereby said reference transducer is connected to said address mark detector;

b) setting said counter to a nominal designated count such that an address mark is successfully detected;

c) selecting another one of said transducers on said nonpackwriting actuator as a to be selected transducer for which said tangential skew correction factor will be generated;

d) setting said counter to said nominal designated count and determining if the next address mark after said selection of said to be selected transducer is successfully detected and if successfully detected proceeding to step f and said nominal designated count being designated second designated count;

e) if said next sector mark was not successfully detected, systematically alternately increasing and decreasing the count about said nominal designated count in said counter until said next sector mark is successfully detected after switching between said reference transducer and said to be selected transducer, said count in said counter upon successfully detecting said next sector mark being designated as said second designated count;

f) systematically increasing the count above said second designated count in said counter until said next sector mark is unsuccessfully detected after switching between said reference transducer and said to be selected transducer, said count in said counter upon unsuccessfully detecting said next sector mark being designated as maximum count;

g) systematically decreasing the count below said second designated count in said counter until said next sector mark is unsuccessfully detected after switching between said reference transducer and said to be selected transducer, said count in said counter upon unsuccessfully detecting said next sector mark being designated as minimum count;

h) determining the middle count between said maximum count and said minimum count;

i) generating said tangential skew correction factor for said to be selected transducer for switching between said reference transducer and said to be selected transducer equal to the difference of subtracting said nominal designated count from said middle count;

j) storing said tangential skew correction factor for said to be selected transducer in memory; and k) repeating steps b, c, d, e, f, g, h, i and j for each other transducer associated with said nonpackwriting actuator;

generating in response to said transducer switching procedure switching from said selected transducer to said to be selected transducer on said nonpackwriting actuator a time value for when an address mark search should be initiated to enable the next address mark to be read by said selected transducer; and altering said time value for when an address mark search should be initiated as a function of said tangential skew correction factor for said to be selected transducer such that said to be selected transducer will read the next address mark to occur on a track being read by said to be selected transducer after said to be selected transducer is selected.

19. The method of claim 18 including the steps of;

l) dividing the data tracks on said disks within said system into zones; and m) repeating steps a, b, c, d, e, f, g, h, i, j and k for each of said zones.

* * * * *

UNITED STATES PATENT AND TRADEMARK OFFICE
CERTIFICATE OF CORRECTION

PATENT NO. : 5,523,901
DATED      : June 4, 1996
INVENTOR(S): Kurt Anderson et al.

It is certified that error appears in the above-indentified patent and that said Letters Patent is hereby corrected as shown below:

```
Column 1,  line 31,  after "and" insert a paragraph.
Column 2,  Line 20,  "assemble" should be --assembly--.
Column 3,  line 11,  after "between" insert -- a --.
Column 3,  line 12,  delete "drive".
Column 3,  line 38,  "surfaces" should be --surface--.
Column 4,  line 7,   "Once" should be --One--.
Column 4,  line 13,  "pluses" should be --pulses--.
Column 4,  line 15,  delete "for the".
Column 4,  line 43,  after "9" insert a period --.--.
Column 5,  line 10,  before "perform" insert --to--.
Column 5,  line 57,  "transduce" should be --transducer--.
Column 21, line 12,  "nonpackwriting" should be --packwriting--.
Column 22, line 57,  "nonpackwriting" should be --packwriting--.
Column 24, line 24,  "nonpackwriting" should be --packwriting--.
```

Signed and Sealed this

Eighteenth Day of November 1997

Attest:

Attesting Officer

BRUCE LEHMAN

Commissioner of Patents and Trademarks